(12) United States Patent
Jabri et al.

(10) Patent No.: US 11,787,140 B2
(45) Date of Patent: Oct. 17, 2023

(54) PNEUMATIC VEHICLE TIRE HAVING A TREAD

(71) Applicant: Continental Reifen Deutschland GmbH, Hannover (DE)

(72) Inventors: Mohamed Aymen Jabri, Hannover (DE); Viktoria Pavon Sierra, Hannover (DE); Sven Kastens, Barsinghausen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 1592 days.

(21) Appl. No.: 15/569,778

(22) PCT Filed: Jan. 26, 2016

(86) PCT No.: PCT/EP2016/051478
§ 371 (c)(1),
(2) Date: Oct. 27, 2017

(87) PCT Pub. No.: WO2016/173728
PCT Pub. Date: Nov. 3, 2016

(65) Prior Publication Data
US 2018/0141296 A1     May 24, 2018

(30) Foreign Application Priority Data
Apr. 29, 2015    (DE) ........................ 102015207937.6

(51) Int. Cl.
    *B60C 11/00*     (2006.01)
    *B60C 1/00*     (2006.01)
    *B29D 30/60*     (2006.01)

(52) U.S. Cl.
CPC ............ *B29D 30/60* (2013.01); *B60C 1/0016* (2013.01); *B60C 11/0058* (2013.01); *B60C 2011/0016* (2013.01); *B60C 2011/0025* (2013.01)

(58) Field of Classification Search
CPC ......... B60C 11/0058; B60C 2011/0016; B60C 2011/0025; B60C 1/0016; B29D 30/60
See application file for complete search history.

(56) References Cited

U.S. PATENT DOCUMENTS

2009/0314401 A1    12/2009   Hitotsuyanagi et al.

FOREIGN PATENT DOCUMENTS

| DE | 19718701 C1 * | 6/1998 | ............ B29D 30/60 |
| DE | 112006004011 T5 | 7/2009 | |

(Continued)

OTHER PUBLICATIONS

Machine translation of DE-19718701 (No date).*

(Continued)

*Primary Examiner* — Justin R Fischer
*Assistant Examiner* — Philip N Schwartz
(74) *Attorney, Agent, or Firm* — Gregory Adams; David L. Cate; Richard Wolf

(57) ABSTRACT

The invention relates to a pneumatic vehicle tire, which has a tread (1), which has a tread segment (6) that is arranged radially outside, said tread segment having a material strip (7) that is arranged helically in windings approximately in the circumferential direction, wherein the material strip (7) in the region of the tread segment (6) has at least two layers (8, 9) in the longitudinal direction of the material strip, wherein the first layer (8) is formed of a first rubber mixture and the second layer (9) is formed of a second rubber mixture and wherein the layers (8, 9) connect the radially outer surface (10) to the radially inner surface (11) of the (Continued)

Figure 1:
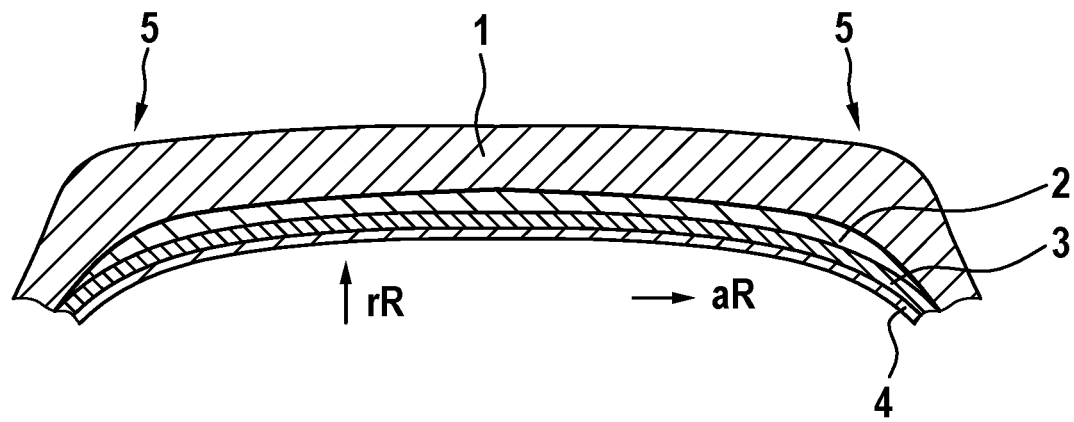

tread segment (6). The problem addressed by the invention is the creation of a pneumatic vehicle tire that has advantageous snow driving behavior and, at the same time, improved properties on a dry roadway. In addition, the tire should be simple to produce. This problem is solved in that the second rubber mixture has a Shore A hardness that is greater than the Shore A hardness of the first rubber mixture by at least 2 Shore A, preferably by 4 Shore A to 12 Shore A, and in that the first and the second rubber mixtures have approximately the same stress value. The invention further relates to a method for producing such a pneumatic vehicle tire.

14 Claims, 3 Drawing Sheets

(56) References Cited

FOREIGN PATENT DOCUMENTS

| | | | | |
|---|---|---|---|---|
| EP | 0875367 A2 | | 11/1998 | |
| JP | 07-117412 | * | 5/1995 | ............ B60C 11/00 |
| JP | 2009000871 A | | 1/2009 | |

OTHER PUBLICATIONS

Machine translation of JP07-117412 (No date).*
Search Report of the International PCT Application PCT/EP2016/051478 dated Apr. 5, 2016.

* cited by examiner

PNEUMATIC VEHICLE TIRE HAVING A TREAD

The invention relates to a pneumatic vehicle tire having a tread, wherein the tread has a tread segment that is arranged radially on the outside, wherein the tread segment has a material strip that is arranged helically in windings approximately in the circumferential direction, wherein, in the region of the tread segment, the material strip has at least two layers in the longitudinal direction of the material strip, wherein the first layer is formed from a first rubber compound and the second layer is formed from a second rubber compound, different from the first, and wherein the first layer and the second layer connect the radially outer surface of the tread segment to the radially inner surface of the tread segment. The invention furthermore relates to a method for producing a pneumatic vehicle tire of this kind.

Different demands are made on the treads of a pneumatic vehicle tire. Since the tread is in direct contact with the roadway, it is important that the radially outer surface of the tread has advantageous properties in respect of adhesion, grip and braking properties for the entire duration of use. Moreover, good handling properties and a low rolling resistance are advantageous. In the case of tires which are to be used in winter driving conditions, advantageous properties in respect of handling on snow, properties on dry roads, such as dry braking and dry handling, wet braking properties, cornering stiffness and rolling resistance should be ensured.

In general, it is not possible to embody treads in such a way in respect of these properties that all the properties are improved to an equal extent. Tires, the tread surface of which has regions comprising different rubber compounds, are known.

Thus, DE 11 2006 004 011 T5 discloses a tire which has a tread region arranged radially on the outside which is formed from a material strip having two layers of different rubber compounds, wherein one compound is of electrically conductive design and the other compound is not of electrically conductive design. Here, the volume ratio of electrically conductive compound in the material strip is lower in the axial center of the tread than in the shoulder region. A tread of this kind is produced by winding an extruded multilayer material strip. A tire of this kind is said to have a low rolling resistance and a capacity for eliminating static charges while having a shorter production cycle time.

A tire of the type stated at the outset is known from EP 0 875 367 A2. Here, the tread portion extends over the entire axial width of the tread, and the rubber compounds of the two layers of the material strip differ in their hardness. Through this combination of rubber compounds of different hardness and thus with different wear behavior, the tire is supposed to have advantageous adhesion while being simple to produce. However, rubber compounds with a low hardness generally have disadvantageous dry handling.

It is the underlying object of the invention to make available a pneumatic vehicle tire which has advantageous handling on snow while simultaneously having improved properties on dry roads. Moreover, the tire should be simple to produce.

According to the invention, the object is achieved by virtue of the fact that, in the vulcanized state, the second rubber compound has a Shore A hardness that is greater than the Shore A hardness of the first rubber compound by at least 2 Shore A, preferably by 4 Shore A to 12 Shore A, determined at room temperature in accordance with DIN ISO 7619-1, and that, in the vulcanized state, the first and the second rubber compounds have approximately the same stress value, determined at 300% elongation at room temperature in accordance with DIN 53504.

It has been found that the object can be achieved well by means of two layers, the rubber compounds of which differ in Shore A hardness by at least 2 Shore A, preferably by 4 Shore A to 12 Shore A and, at the same time, have approximately the same stress value.

The radially outer surface of the tread segment, which comes into contact with the roadway during driving, is formed or partially formed by the approximately circumferentially wound compound strips having two layers comprising different rubber compounds. The contact surface is thus formed by regions comprising different rubber compounds. In the vulcanized state, the two rubber compounds of the first and the second layer differ here in Shore A hardness, wherein the first layer of lower Shore A hardness has an advantageous effect on handling on snow and the second layer of higher Shore A hardness has an advantageous effect on dry handling.

At the same time, the first and second rubber compounds have approximately the same stress value at 300% elongation and room temperature in accordance with DIN 53504 in the vulcanized state. "Approximately equal stress values" should be taken to mean stress values which differ by at most 2%, preferably at most 1%, from one another, wherein the respectively lower value is taken as 100%. The stress value serves as a measure of semi-dynamic stiffness. A pneumatic vehicle tire of this kind has further improved properties on dry roads. A pneumatic vehicle tire having a tread of this kind is thus improved in respect of the conflict of aims between handling on snow and properties on dry roads and, as a result, it is, in particular, outstandingly suitable for use in winter driving conditions.

Since both layers extend over the radial extent of the tread segment, the stated advantages are obtained over the wear life of the tread segment. Since both layers are applied as a material strip, the tire is furthermore distinguished by a simple production process and a short production cycle time.

With pneumatic vehicle tires embodied according to the invention, one or the other property, in particular handling on snow and properties on dry roads, can be established particularly effectively by means of special configurations according to the invention.

It is advantageous here for optimum improvement of the tire properties mentioned if, in the vulcanized state, the first rubber compound has a Shore A hardness of 41 Shore A to 65 Shore A and the second rubber compound has a Shore A hardness of 49 Shore A to 76 Shore A.

In an advantageous embodiment of the invention, the two rubber compounds have a stress value of 3 MPa to 7 MPa, determined at 300% elongation at room temperature in accordance with DIN 53504. This measure results in improved dry braking and thus improved properties on dry roads for the pneumatic vehicle tire, particularly by way of the improvement of the dry braking properties of the second rubber compound.

In another advantageous embodiment of the invention, the two rubber compounds have a stress value of between 7 MPa and 13 MPa, determined at 300% elongation at room temperature in accordance with DIN 53504. This measure results in further improved properties on dry roads, particularly by way of the improvement of the dry handling properties of the first rubber compound.

It is also advantageous if the interface between the first layer and the second layer has a mean slope angle per winding of −80° to 80° to the radial direction of the pneumatic vehicle tire, if the ratio of the volume of the first layer to the volume of the second layer per winding is 1:1 to 10:1 and/or if the mean cross-sectional thickness per winding of the first layer and/or the mean cross-sectional thickness per winding of the second layer is 0.5 mm to 5 mm, preferably 0.5 mm to 1 mm. The mean slope angle of the interface can be adjusted by means of the degree of overlap between adjacent windings of the material strip and/or by means of the geometry of the layers within the material strip, for example. The mean slope angle per winding is the angle enclosed by the interface and the radial direction, which is averaged over the extent of the interface per winding according to the arithmetic mean. The mean cross-sectional thickness per winding is also averaged according to the arithmetic mean. Any anisotropy in the radial direction and in the axial direction leads to advantageous decoupling of the longitudinal and lateral handling properties. Furthermore, a tire of this kind is distinguished by improved tread stability.

It is expedient if the ratio of the volume of the first layer to the volume of the second layer per winding of the material strip is not constant over the entire axial width of the tread but changes in the axial direction. This allows an advantageous improvement of the properties of the tread surface according to the different requirements, in relation to the axial width of the tire.

A particularly advantageous embodiment allows for the different demands on the tread surface in the shoulder region versus a region axially between the shoulder regions in that, in at least one shoulder region, the tread has a tread segment and, axially to the inside relative to the tread segment, a further segment, arranged radially on the outside, of the tread, and in that the volume density of second rubber compound in the further segment is lower than the volume density of second rubber compound in the tread segment, preferably in that the volume density of second rubber compound in the further segment is equal to 0. It is preferable if both shoulder regions have a tread segment of this kind. The second rubber compound preferably excels in respect of properties that are important especially in the shoulder region, such as rolling resistance and properties on dry roads, and the first rubber compound excels in respect of properties that are important especially in the central region, such as braking properties. Here, a material strip can form or partially form both the tread segment or segments and the further tread segment.

Advantageous decoupling between the longitudinal and lateral handling properties while taking into account the changing requirements in the axial direction is obtained if, within the tread segment, the mean slope angle per winding that is enclosed by the interface between the first layer and the second layer of the material strip and the radial direction changes in the axial direction. It is preferred here if the mean slope angle per winding increases in magnitude from axially on the inside to axially on the outside. A pneumatic vehicle tire of this kind with a relatively steep slope in the shoulder region in comparison with axially inner regions has even better handling.

Particularly advantageous decoupling between the longitudinal and lateral handling properties while taking into account the changing requirements in the axial direction is obtained if the tread has a tread segment in each shoulder region and if the two tread segments differ in the sign of the mean slope angle thereof per winding that is enclosed by the interfaces between the first layer and the second layer of the respective material strip and the radial direction, preferably if the mean slope angles per winding increase in magnitude from axially on the inside to axially on the outside.

Positive handling properties, in particular particularly positive cornering properties, are also obtained if the tread has a tread segment in each shoulder region, and if the two tread segments differ in the sign of the mean slope angle thereof per winding that is enclosed by the interfaces between the first layer and the second layer of the respective material strip and the radial direction. In this case, the two tread segments can be formed or partially formed by the same material strip. The region axially between the two tread segments preferably has less rubber compound per winding than in the two tread segments or has no rubber compound.

An improvement in respect of three or more properties is achieved if the material strip has a third layer composed of a rubber compound different from the first and second rubber compounds. The third layer can but does not have to be arranged on the tread in the region of the tread segment. It is advantageous if the first rubber compound is a conventional cap compound, the second rubber compound is a conventional base compound and the rubber compound of the third layer, which is different therefrom, is a rubber compound having advantageous rolling resistance properties.

It is expedient if the tread has a material strip comprising electrically conductive material, wherein the electrically conductive material connects the tread surface in an electrically conductive manner to an electrically conductive component arranged radially to the inside of the material strip. An electrically conductive path for the dissipation of static charge radially inwards from the tread surface is thereby created.

For a simple production process with a short cycle time, it is advantageous if the material strip extends over at least 80% of the axial width, preferably over the entire axial width, of the tread. Here, the material strip can comprise a plurality of tread segments.

In an expedient embodiment of the invention, the tread segment extends over the entire radial extent of the tread. In another expedient embodiment, the tread segment forms at least one part of the tread cap and extends over only a part of the radial extent of the tread, which, in the radial direction, has a cap layer arranged radially on the outside and a base layer situated radially on the inside with respect to the latter.

Pneumatic vehicle tires embodied according to the invention are suitable, in particular, as tires for motorcars, vans, commercial vehicles, industrial vehicles or motorcycles, in particular for motorcars for use in winter driving conditions.

A particularly simple and advantageous method for producing a pneumatic vehicle tire according to the invention is provided by a procedure in which, to form the tread segment arranged radially on the outside, a material strip is wound on approximately helically in the circumferential direction of the pneumatic vehicle tire, in which the material strip comprises the first layer and the second layer, and in which the multilayer material strip is extruded by co-extrusion as a material strip or produced by cutting a calendered multicompound web and joining together the pieces thereby obtained. A production method of this kind ensures a high quality tread segment, even when the layers of the material strip are thin. Moreover, the method involving the winding of the multilayer material strip is distinguished by a short cycle time.

Further features, advantages and details of the invention are now explained by means of the schematic drawings, which show illustrative embodiments. In the drawings:

FIG. 1 shows a partial cross section through the tread region of a pneumatic vehicle tire comprising one embodiment of the invention, FIG. 2 to FIG. 6 each show schematically an embodiment according to the invention of the tread.

FIG. 1 shows schematically and by way of example a partial cross section of a motorcar tire. The customary constituent parts of the tire include, in particular, a tread 1, a belt structure 2 arranged radially on the inside of the tread 1 and comprising a plurality of belt plies and optionally a belt bandage, furthermore a radial carcass 3, a largely airtight inner liner 4 and side walls (not shown) as well as bead regions with bead cores, core profiles and further reinforcing plies possibly provided in the bead regions. The tread 1 is provided, in particular in a manner known per se, with profiling, which is not shown.

The tread 1 extends beyond the width of the tire in the ground contact area and ends in the shoulder regions 5. At the shoulders, tread end regions consisting of the side wall compound can be provided.

FIGS. 2 to 6 each show schematically an embodiment according to the invention of the tread. The embodiments are suitable for a tread 1 of a motorcar tire of the kind illustrated in FIG. 1, in particular for a motorcar tire for use in winter driving conditions.

The treads 1 illustrated in FIGS. 2 to 6 each have a tread segment 6 arranged radially on the outside, wherein the tread segment 6 has a material strip 7, which is arranged helically in windings approximately in the circumferential direction. In the region of the tread segment 6, the material strip 7 has at least two layers 8, 9 in the longitudinal direction thereof, wherein the first layer 8 is formed from a first rubber compound and the second layer 9 is formed from a second rubber compound different from the first compound, wherein the first layer 8 and the second layer 9 connect the radially outer surface 10 of the tread segment 6 to the radially inner surface 11 of the tread segment 6.

The shore A hardness of the first rubber compound is 41 Shore A to 65 Shore A in the vulcanized state, and the Shore A hardness of the second rubber compound in the vulcanized state is 49 Shore A to 76 Shore A, determined at room temperature in accordance with DIN ISO 7619-1. Here, the Shore A hardnesses of the two rubber compounds differ by 4 Shore A to 12 Shore A. Furthermore, the first and second rubber compounds have approximately the same stress value in the vulcanized state, determined at 300% elongation at room temperature in accordance with DIN 53504.

In a first embodiment in each case, the treads 1 shown in FIGS. 2 to 6 have rubber compounds in the first and second layers thereof with respective stress values of 3 MPa to 7 MPa, determined at 300% elongation at room temperature in accordance with DIN 53504.

In a second embodiment in each case, the treads 1 shown in FIGS. 2 to 6 have rubber compounds in the first and second layers thereof with respective stress values between 7 MPa and 13 MPa, determined at 300% elongation at room temperature in accordance with DIN 53504.

The treads 1 shown are produced at least partially by a procedure in which, to form the tread segment 6 arranged radially on the outside, a material strip 7 is wound on approximately helically in the circumferential direction of the pneumatic vehicle tire, wherein the material strip 7 comprises the first 8 and the second layer 9. In this case, the multilayer material strip 7 is extruded, in particular, by co-extrusion as a material strip or produced by cutting a calendered multi-compound web and joining together the pieces thereby obtained.

Figure 2:
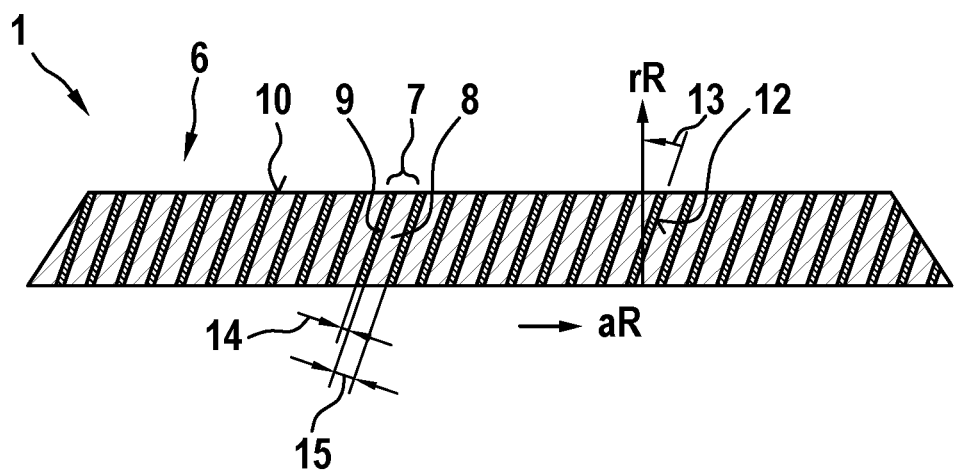

FIG. 2 shows a tread 1 which is formed by a material strip 7 arranged helically in windings in the circumferential direction, wherein the material strip 7 is of two-layer design over the entire length thereof. The material strip 7 extends over the entire axial width of the tread 1, and the tread segment 6 extends substantially over the entire axial width of the tread 1.

The interface 12 between the first layer 8 and the second layer 9 has a mean slope angle 13 per winding of −80° to 80° to the radial direction rR of the pneumatic vehicle tire.

Furthermore, the ratio of the volume of the first layer 8 relative to the volume of the second layer 9 per winding is 1:1 to 10:1 and the mean cross-sectional thickness 14 per winding of the first layer 8 and/or the mean cross-sectional thickness 15 per winding of the second layer 9 is 0.5 mm to 1 mm.

Figure 3:
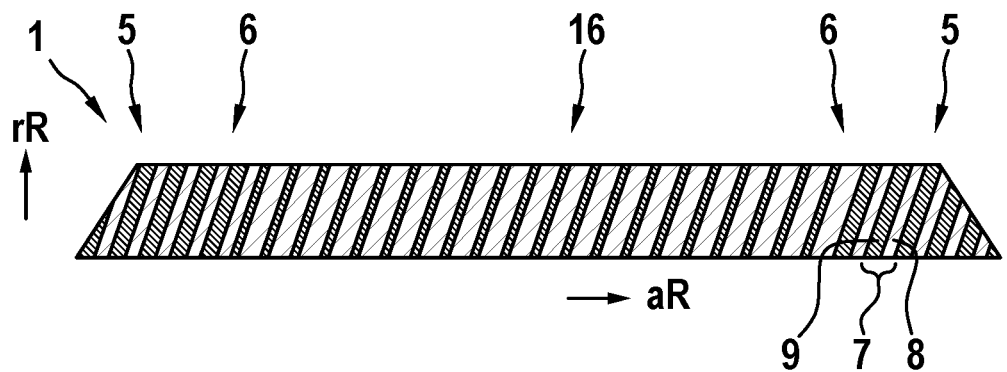
Figure 4:
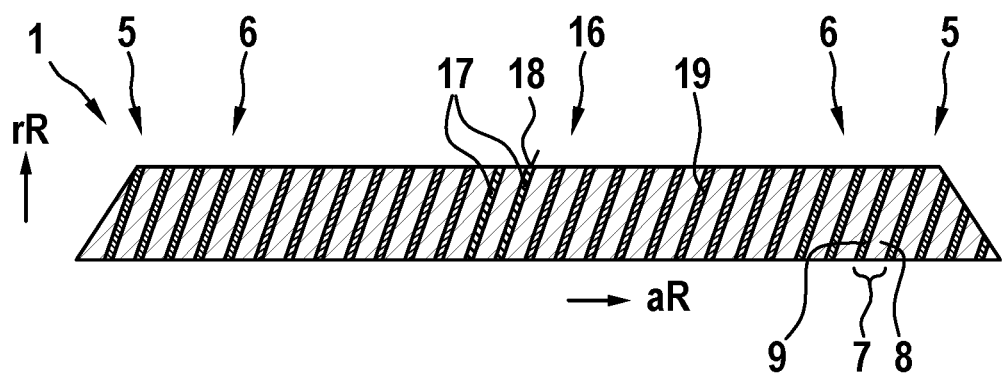

FIGS. 3 and 4 each show a tread 1, which has a tread segment 6 in both shoulder regions 5 and, axially to the inside relative to the tread segments 6, a further segment 16, arranged radially on the outside, of the tread 1, wherein the volume density of second rubber compound in the further segment 16 is lower than the volume density of second rubber compound in the tread segments 6.

Here, the illustrative embodiment shown in FIG. 3 also has the second rubber compound in the further segment 16. In particular, segments 6 and 16 are formed from a single material strip 7, wherein the ratio of the volume of the first layer 8 of a winding to the volume of the second layer 9 of the winding of the material strip 7 changes in the axial direction.

In the illustrative embodiment shown in FIG. 4, the volume density of second rubber compound in the further segment 16 is equal to 0. Layer 19 is thus formed from a rubber compound different from the first rubber compound. In particular, the further segment 16 has a material strip comprising electrically conductive material 17, wherein the electrically conductive material 17 connects the tread surface 18 in an electrically conductive manner to an electrically conductive component arranged radially to the inside of the material strip. In particular, segments 6 and 16 are formed from different material strips. However, segments 6 and 16 can also be formed from a material strip, the second layer of which is not formed from the second rubber compound in the region of segment 16 but from a rubber compound different therefrom, in particular from the first rubber compound and/or from electrically conductive material 17.

Figure 5:
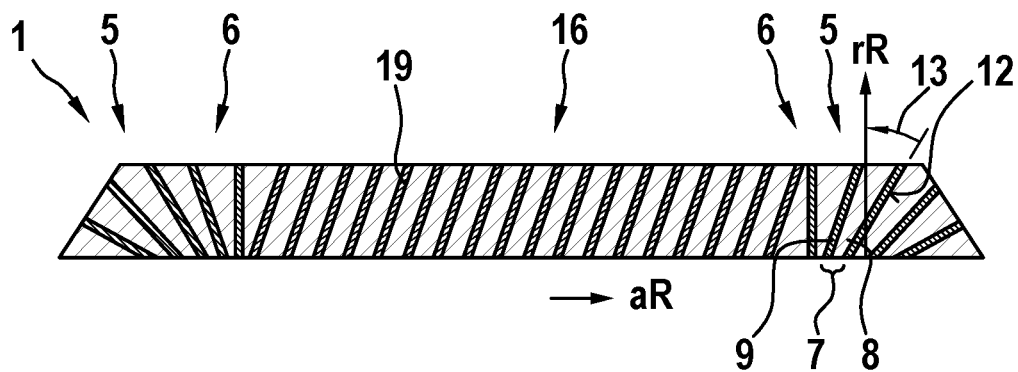
Figure 6:
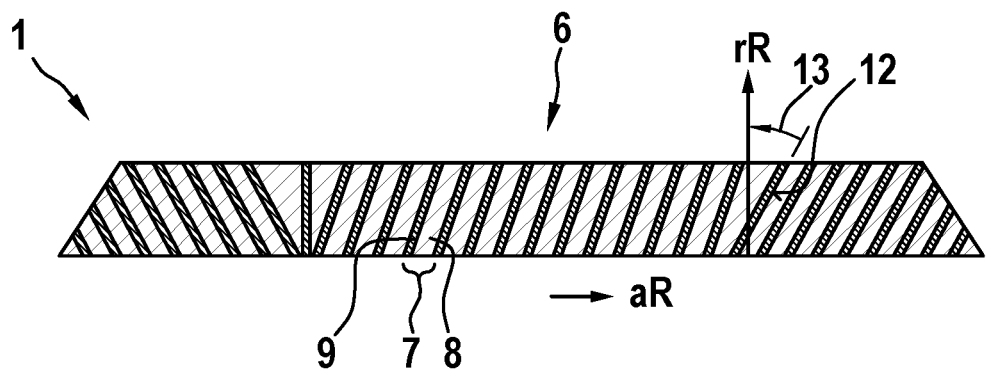

FIGS. 5 and 6 each show a tread 1 having at least one tread segment 6, wherein, within the tread segment 6, the mean slope angle 13 per winding that is enclosed by the interface 12 between the first layer 8 and the second layer 9 of the material strip and the radial direction changes in the axial direction. Moreover, the two shoulder regions differ at least in the sign of the mean slope angle 13 per winding that is enclosed by the interfaces 12 between the first layer 8 and the second layer 9 of the respective material strip 7 and the radial direction.

Here, the tread 1 illustrated in FIG. 5 differs from the tread 1 illustrated in FIG. 4 essentially in that, within the tread segments 6 arranged in the shoulder regions 5, the mean slope angle 13 per winding increases in magnitude from axially on the inside to axially on the outside and that the two tread segments 6 differ in the sign of the mean slope angle 13 thereof per winding that is enclosed by the interfaces 12 between the first layer 8 and the second layer 9 of the respective material strip 7 and the radial direction.

In particular, the tread illustrated in FIG. 6 is formed from a material strip 7.

The tread 1 illustrated in FIGS. 2 to 6 can form or partially form substantially the entire tread of a pneumatic vehicle tire or a radially outer region of the tread, in particular the "cap layer".

Tables 1 and 2 below contain examples of rubber compound compositions $M1_1$ and $M2_1$ for the first layer 8 and rubber compound compositions $M1_2$ and $M2_2$ for the second layer 9 of the compound strip 7. A compound strip 7 of this kind is suitable, in particular, as a compound strip 7 for the treads 1 illustrated in FIGS. 2 to 6. The quantity data are given in the unit phr (parts per hundred rubber) customary in rubber technology. In each case, the quantity data relate to the proportions by mass of the base polymer or, in the case of polymer blends, to those of the base polymers. Also given are the physical properties of Shore A hardness, determined at room temperature in accordance with DIN ISO 7619-1, and stress value, determined at 300% elongation at room temperature in accordance with DIN 53504.

TABLE 1

|  | Unit | $M1_1$ | $M1_2$ |
|---|---|---|---|
| Constituents |  |  |  |
| NR [a] | phr | 20 | 5 |
| BR [b] | phr | 50 | 27 |
| SBR [c] | phr | 41.25 |  |
| SBR [d] | phr |  | 68 |
| Silica [e] | phr | 85 | 85 |
| Carbon black N 399 | phr | 14 | 14 |
| Plasticizer [f] | Phr | 34 | 49 |
| Silane [g] | phr | 6 | 6.2 |
| Other additives [h] | phr | 16.7 | 16.7 |
| S and accelerator [i] | phr | 5.9 | 5.9 |
| Physical properties |  |  |  |
| Shore A hardness | Shore A | 57 | 63 |
| Stress value | MPa | 5.9 | 5.9 |

Substances used
[a] Natural rubber TSR
[b] BR: BUNA CB 24, Lanxess
[c] SBR: Buna VSL 5025-2, Lanxess
[d] SBR: Sprintan™ SLR 3402, Styron
[e] Silica Ultrasil VN3, Evonik
[f] Plasticizer Vivatec C500, Thai Base Public Company Ltd.
[g] Silane Si263, Evonik
[h] Other additives: antioxidant 6PPD, zinc oxide, stearic acid
[i] Sulphur and accelerator CBS

TABLE 2

|  | Unit | $M2_1$ | $M2_2$ |
|---|---|---|---|
| Constituents |  |  |  |
| NR [a] | phr | 10 | 10 |
| BR [b] | phr | 67 | 33 |
| SBR [c] | phr | 23 | 57 |
| Silica [d] | phr | 103 | 103 |
| Carbon black N 399 | phr | 5 | 5 |
| Plasticizer [e] | phr | 57.3 | 41.3 |
| Silane [f] | phr | 8.5 | 8.5 |
| Other additives. [g] | phr | 16.7 | 16.7 |
| S and accelerator [h] | phr | 9.83 | 9.83 |
| Physical properties |  |  |  |
| Shore A hardness | Shore A | 65 | 72 |
| Stress value | MPa | 10 | 10 |

Substances used
[a] Natural rubber TSR
[b] BR: BUNA CB 24, Lanxess
[c] SBR: Sprintan™ SLR 3402, Styron
[d] Silica Zeosil® 1165 MP, Rhodia
[e] Plasticizer Vivatec C500, Thai Base Public Company Ltd.
[f] Silane Si263, Evonik
[g] Other additives: antioxidant 6PPD, zinc oxide, stearic acid
[h] Sulphur and accelerator CBS

LIST OF REFERENCE SIGNS

Part of the Description 1 tread
2 belt assembly
3 radial carcass
4 inner liner
5 shoulder region
6 tread segment
7 material strip
8 first layer
9 second layer
10 radially outer surface of the tread segment
11 radially inner surface of the tread segment
12 interface
13 slope angle
14 mean cross-sectional thickness of the first layer
15 mean cross-sectional thickness of the second layer
16 further segment of the tread
17 electrically conductive material
18 tread surface
19 layer

The invention claimed is:

1. A pneumatic vehicle tire comprising a tread,
wherein the tread comprises a tread segment arranged radially on an outside of the pneumatic vehicle tire;
wherein the tread segment comprises a material strip arranged helically in windings approximately in a circumferential direction outside of the pneumatic vehicle tire;
wherein, in a region of the tread segment, the material strip comprises at least two layers in a longitudinal direction of the material strip, and wherein the at least two layers comprise a first layer and a second layer;
wherein a first layer of the material strip is formed from a first rubber compound and a second layer of the material strip is formed from a second rubber compound, different from the first layer;
wherein the first layer and the second layer connect a radially outer surface of the tread segment to a radially inner surface of the tread segment;
wherein, in a vulcanized state, the second rubber compound has a Shore A hardness that is greater than the Shore A hardness of the first rubber compound by at least 2, the Shore A hardness determined at room temperature in accordance with DIN ISO 7619-1; and, wherein, in the vulcanized state, the first rubber compound and the second rubber compound have approximately the same stress value, determined at 300% elongation at room temperature in accordance with DIN 53504.

2. The pneumatic vehicle tire as claimed in claim 1, wherein in the vulcanized state, the first rubber compound has a Shore A hardness of 41 Shore A to 65 Shore A, and the second rubber compound has a Shore A hardness of 49 Shore A to 76 Shore A.

3. The pneumatic vehicle tire as claimed in claim 1, wherein the first rubber compound and second rubber compound each have a stress value of 3 MPa to 7 MPa, determined at 300% elongation at room temperature in accordance with DIN 53504.

4. The pneumatic vehicle tire as claimed in claim 1, wherein the first rubber compound and second rubber compound each have a stress value of between 7 MPa and 13 MPa, determined at 300% elongation at room temperature in accordance with DIN 53504.

5. The pneumatic vehicle tire as claimed in claim 1, wherein within the tread segment, it is the case that the interface (between the first layer and the second layer has a mean slope angle per winding of −80° to 80° to radial direction rR of the pneumatic vehicle tire, in that the ratio of volume of the first layer relative to volume of the second layer per winding is from 1:1 to 10:1, and/or in mean cross-sectional thickness per winding of the first layer and/or mean cross-sectional thickness per winding of the second layer is 0.5 mm to 1 mm.

6. The pneumatic vehicle tire as claimed in claim 1, wherein, in one or two shoulder regions of the tread, the tread comprises a tread segment and, axially to an inside relative to the tread segment, the tread comprises a further segment, arranged radially on the outside, of the tread, and in that volume density of second rubber compound in the further segment is lower than volume density of second rubber compound in the tread segment (6), the volume density of second rubber compound in the further segment (16) is equal to 0.

7. The pneumatic vehicle tire as claimed in claim 1, wherein, in one or two shoulder regions of the tread, the tread comprises a tread segment and, axially to an inside relative to the tread segment, the tread comprises a further segment, arranged radially on the outside, of the tread, and in that volume density of second rubber compound in the further segment is lower than volume density of second rubber compound in the tread segment, in that the volume density of second rubber compound in the further segment is equal to 0.

8. The pneumatic vehicle tire as claimed in claim 1, wherein within the tread segment, the mean slope angle per winding that is enclosed by an interface between the first layer and the second layer of the material strip and the radial direction rR changes in an axial direction aR, the mean slope angle per winding increases in magnitude from axially on the inside to axially on the outside.

9. The pneumatic vehicle tire as claimed in claim 1, wherein the tread comprises a tread segment in each shoulder region, and in that the two tread segments differ in the sign of the mean slope angle thereof per winding that is enclosed by an interface between the first layer and the second layer of the respective material strip and a radial direction rR.

10. The pneumatic vehicle tire as claimed in claim 1, wherein the material strip comprises a third layer composed of a rubber compound different from the first rubber compound and second rubber compound.

11. The pneumatic vehicle tire as claimed in at least claim 10, wherein the material strip extends over at least 80% of axial width of the tread.

12. The pneumatic vehicle tire as claimed in claim 1, the tread segment is configured for use in winter driving conditions.

13. The pneumatic vehicle tire as claimed in claim 1, the tread segment is arranged radially on the outside, a material strip is wound on approximately helically in a circumferential direction of the pneumatic vehicle tire, wherein the material strip comprises the first layer and the second layer, and wherein the material strip is an extruded material based on a calendered multi-compound web.

14. The pneumatic vehicle tire as claimed in claim 1, wherein, in a vulcanized state, the second rubber compound has a Shore A hardness that is greater than the Shore A hardness of the first rubber compound by 4 Shore A to 12 Shore A, determined at room temperature in accordance with DIN ISO 7619-1.

* * * * *